US006973626B1

(12) United States Patent
Lahti et al.

(10) Patent No.: US 6,973,626 B1
(45) Date of Patent: Dec. 6, 2005

(54) AUTOMATICALLY GENERATING GRAPHICAL USER INTERFACE ELEMENTS AT A CLIENT SYSTEM ACCORDING TO A CURRENT CONFIGURATION MODEL

(75) Inventors: Samu J. Lahti, Pori (FI); Harri P. Rajala, Pori (FI)

(73) Assignee: i2 Technologies US, Inc., Dallas, TX (US)

( * ) Notice: Subject to any disclaimer, the term of this patent is extended or adjusted under 35 U.S.C. 154(b) by 571 days.

(21) Appl. No.: 10/086,761

(22) Filed: Feb. 28, 2002

Related U.S. Application Data

(60) Provisional application No. 60/300,240, filed on Jun. 22, 2001, provisional application No. 60/300,276, filed on Jun. 22, 2001.

(51) Int. Cl.$^7$ .................................................. G06F 3/00
(52) U.S. Cl. ........................ 715/763; 715/853; 715/744
(58) Field of Search ............................... 345/763, 853; 715/763, 853, 744

(56) References Cited

U.S. PATENT DOCUMENTS

| | | | |
|---|---|---|---|
| 5,535,321 A | 7/1996 | Massaro et al. | |
| 5,710,887 A | 1/1998 | Chelliah et al. | |
| 6,104,392 A | 8/2000 | Shaw et al. | |
| 6,330,007 B1 | 12/2001 | Isreal et al. | |
| 6,397,212 B1 * | 5/2002 | Biffar | 707/5 |
| 6,429,882 B1 | 8/2002 | Abdelnur et al. | |
| 6,460,042 B1 | 10/2002 | Hitchcock et al. | |
| 6,484,149 B1 | 11/2002 | Jammes et al. | |
| 6,609,108 B1 | 8/2003 | Pulliam et al. | |
| 6,728,685 B1 * | 4/2004 | Ahluwalia | 705/26 |
| 6,728,769 B1 | 4/2004 | Hoffmann | |
| 6,760,750 B1 | 7/2004 | Bonch et al. | |

| | | |
|---|---|---|
| 2002/0032701 A1 | 3/2002 | Gao et al. |

(Continued)

FOREIGN PATENT DOCUMENTS

| | | |
|---|---|---|
| EP | 0 367 709 | 10/1989 |
| EP | 0 442 676 A2 | 11/1991 |
| WO | WO 99/09658 | 2/1999 |

OTHER PUBLICATIONS

Lahti, et al., "Using Connectors to Automatically Update Graphical User Interface Elements at a Client System According to an Updated State of a Configuration," Pending, 10/086,757, 48 pages, Feb. 28, 2002.

(Continued)

*Primary Examiner*—Ba Huynh
*Assistant Examiner*—Sara Hanne
(74) *Attorney, Agent, or Firm*—James E. Walton

(57) ABSTRACT

A system for automatically generating a GUI element at a client system according to a current configuration model includes one or more software components generated at a server system for communication to a client system in connection with a configuration workflow. When loaded at the client system, the one or more software components include data reflecting the current configuration model. When loaded at the client system, the one or more software components also include one or more parameters specifying the GUI element that will be appropriate for a configuration choice depending on the current configuration model as reflected in the data. When executed at the client system, the one or more software components automatically determine, according to the data reflecting the current configuration model, a configuration choice for which an appropriate GUI element needs to be drawn for display to a user associated with the client system in connection with the configuration workflow. The one or more software components also automatically draw, according to the one or more parameters, the GUI element that is appropriate for the determined configuration choice.

35 Claims, 4 Drawing Sheets

U.S. PATENT DOCUMENTS

| | | | |
|---|---|---|---|
| 2002/0054085 A1 | 5/2002 | Taylor et al. | |
| 2002/0069204 A1 | 6/2002 | Kahn et al. | |
| 2002/0099583 A1* | 7/2002 | Matusek et al. | 705/7 |
| 2002/0104023 A1* | 8/2002 | Hewett et al. | 713/201 |
| 2002/0152239 A1* | 10/2002 | Bautista-Lloyd et al. | 707/513 |
| 2003/0093585 A1 | 5/2003 | Allan | |

OTHER PUBLICATIONS

PCT, Notification of Transmittal of the International Search Report or the Declaration, 8 pages Dec. 20, 2001.

Unknown Author, "Doing Page Layout With Tables," Chapter 9, Tables, http://www.mcp.com, 2 Pages.

Unknown Author, "Coding Complex Tables," Chapter 9, Tables, http://www.mcp.com, 3 Pages.

Fraternali, et al., "Model-Driven Development of Web Applications: The Autoweb System" ACM Transactions on Information Systems, vol. 28, No. 4, Oct. 2000, pp. 323-382.

Huang, et al. "SecureFlow: A Secure Web-enabled Workflow Management System" 1999 ACM pp. 83-94.

Unknown Author "Using Mainframe Host Panel Source to Produce Graphic User Interface Panel Dynamically",. vol. 37, No. 08, Aug. 1994, IBM Technical Disclosure Bulletin, 1 page.

* cited by examiner

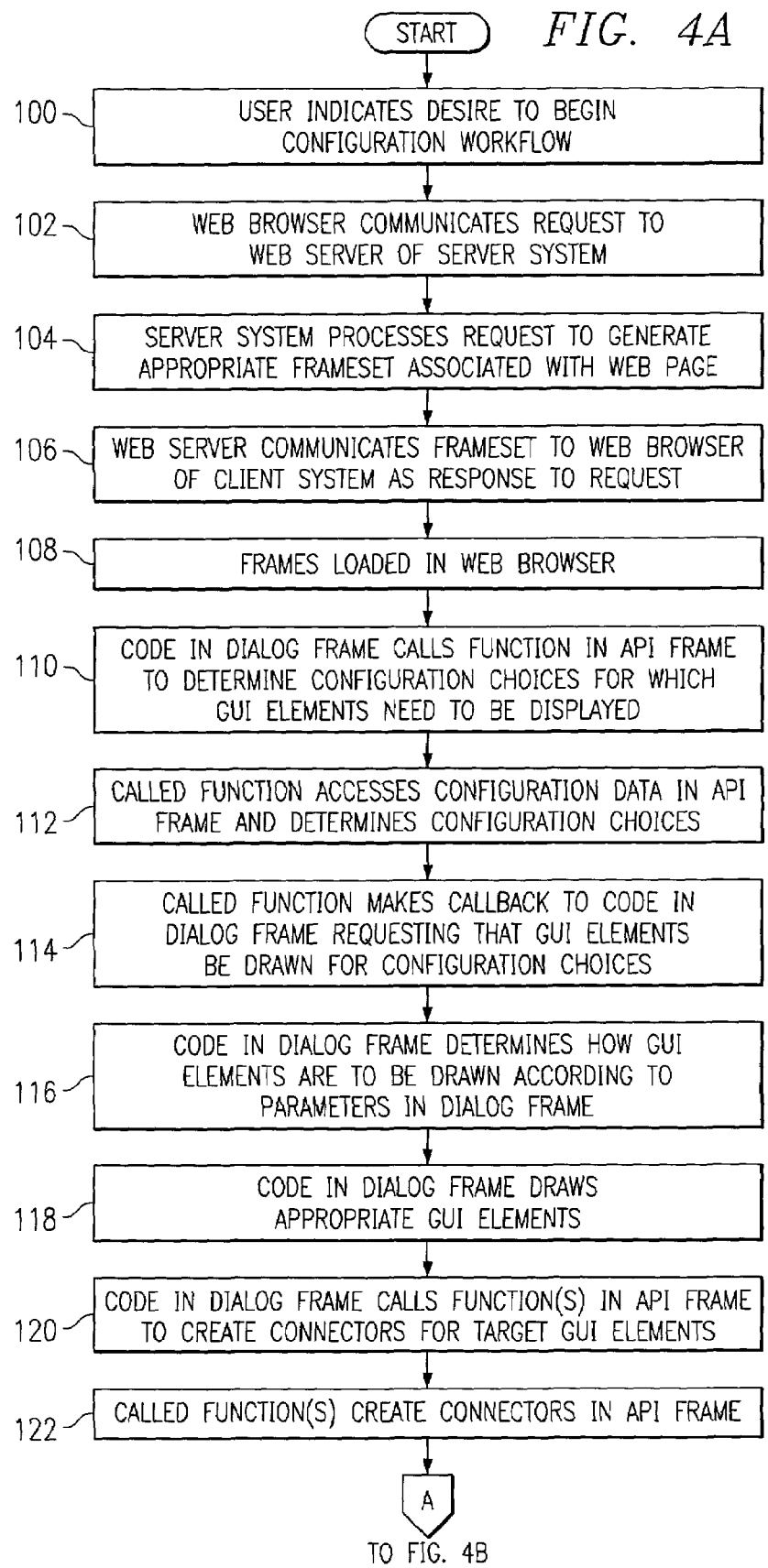

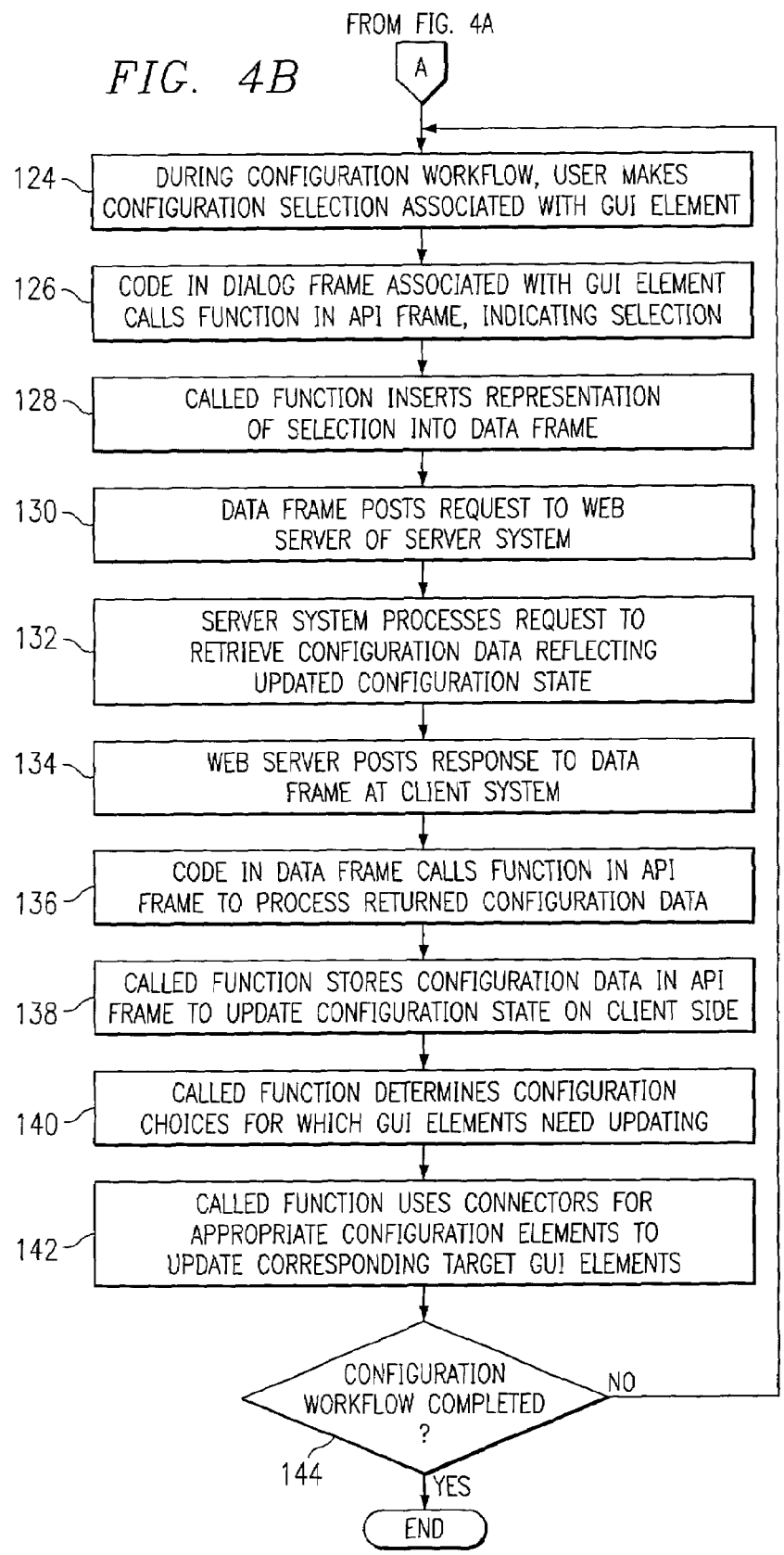

AUTOMATICALLY GENERATING GRAPHICAL USER INTERFACE ELEMENTS AT A CLIENT SYSTEM ACCORDING TO A CURRENT CONFIGURATION MODEL

RELATED APPLICATIONS

This application claims the benefit under 35 U.S.C. § 119(e) of U.S. Provisional Application Nos. 60/300,240 and 60/300,276, both filed Jun. 22, 2001.

This application is related to co-pending U.S. application Ser. No. 09/551,899 filed Apr. 19, 2000; Ser. No. 09/948,500 filed Sep. 6, 2001; and Ser. No. 10/086,757 filed Feb. 28, 2002.

TECHNICAL FIELD OF THE INVENTION

This invention relates generally to web-based communications, such as might occur over the Internet in connection with an electronic commerce transaction, and more particularly to automatically generating graphical user interface (GUI) elements at a client system according to a current configuration model.

BACKGROUND OF THE INVENTION

As the Internet continues to grow increasingly important, increasing amounts of information and functionality are available to Internet users through web pages generated using GUIs. For example, within an electronic commerce environment, a product configuration GUI may generate various GUI elements for display on one or more web pages to a user configuring a product. The GUI elements displayed to a user on a web page may depend on an underlying product configuration model that models applicable configuration rules and on the state of the configuration when the web page is generated. For example, if a user is configuring a particular make and model of automobile, a first web page may allow the user to select either a coupe or a sedan body style using radio buttons. Based on selection of the coupe body style, a second web page may be generated according to product configuration model and the current configuration state (i.e. coupe body style selected), allowing the user to select either a regular, a sport, or a premium trim line using a drop-down list box. Based on the selection of the regular trim line, a third web page may be generated according to the product configuration model and the current configuration state (i.e. coupe body style and regular trim line selected), allowing the user to select zero or more options available with the coupe body style and regular trim line using a series of check box elements. In developing the product configuration GUI, a developer may determine which type of GUI element to use in connection with a configuration choice based on the number of alternatives available to the user. For example, if only two alternatives are available, radio buttons may be most desirable, but if three or more alternatives are available, a drop-down list box may be most desirable. In prior systems, if the underlying configuration model is changed to reflect a real-world change such as unavailability of the sport trim line, a maintainer of the associated website would be required to manually change the configuration GUI such that the alternatives for trim line (now reduced from three to two) are presented to future users using radio buttons instead of a drop-down list box. This may increase costs associated with maintaining the website, delay implementation of changes to the configuration GUI, and decrease user satisfaction due to display of inappropriate GUI elements.

SUMMARY OF THE INVENTION

According to the present invention, problems and disadvantages associated with prior techniques for generating GUI elements based on a configuration model may be reduced or eliminated.

In one aspect of the present invention, a system for automatically generating a GUI element at a client system according to a current configuration model includes one or more software components generated at a server system for communication to a client system in connection with a configuration workflow. When loaded at the client system, the one or more software components include data reflecting the current configuration model. When loaded at the client system, the one or more software components also include one or more parameters specifying the GUI element that will be appropriate for a configuration choice depending on the current configuration model as reflected in the data. When executed at the client system, the one or more software components automatically determine, according to the data reflecting the current configuration model, a configuration choice for which an appropriate GUI element needs to be drawn for display to a user associated with the client system in connection with the configuration workflow. The one or more software components also automatically draw, according to the one or more parameters, the GUI element that is appropriate for the determined configuration choice.

Certain embodiments of the present invention may provide one or more technical advantages. For example, certain embodiments may allow appropriate GUI elements to be generated automatically at runtime ("on the fly") on the client side according to a current applicable configuration model. Changes to the configuration model may therefore be reflected automatically in the GUI elements displayed to a user during a configuration workflow. Thus, if the configuration model is changed to reflect a real-world change (such as the unavailability of the sport trim line in the previous example), a maintainer of the website or other person would not be required to manually change a configuration GUI (such that alternatives for trim line in the previous example would be presented to future users using radio buttons instead of a drop-down list box). Certain embodiments may thus decrease the costs associated with maintaining the website, speed implementation of configuration GUI changes, and increase user satisfaction through the display of more appropriate GUI elements. Techniques incorporating one or more of these or other technical advantages may be well suited for certain electronic commerce environments, such as those associated with electronic marketplaces or other Internet websites at which products may be configured for purchase. Certain embodiments may provide some, all, or none of these technical advantages. One or more other technical advantages may be readily apparent to those skilled in the art from the figures, descriptions, and claims included herein.

BRIEF DESCRIPTION OF THE DRAWINGS

To provide a more complete understanding of the present invention and features and advantages thereof, reference is made to the following description in conjunction with the accompanying drawings, in which:

FIG. 4 illustrates an example method for automatically generating GUI elements at a client system according to a current configuration model.

DESCRIPTION OF EXAMPLE EMBODIMENTS

Figure 1:
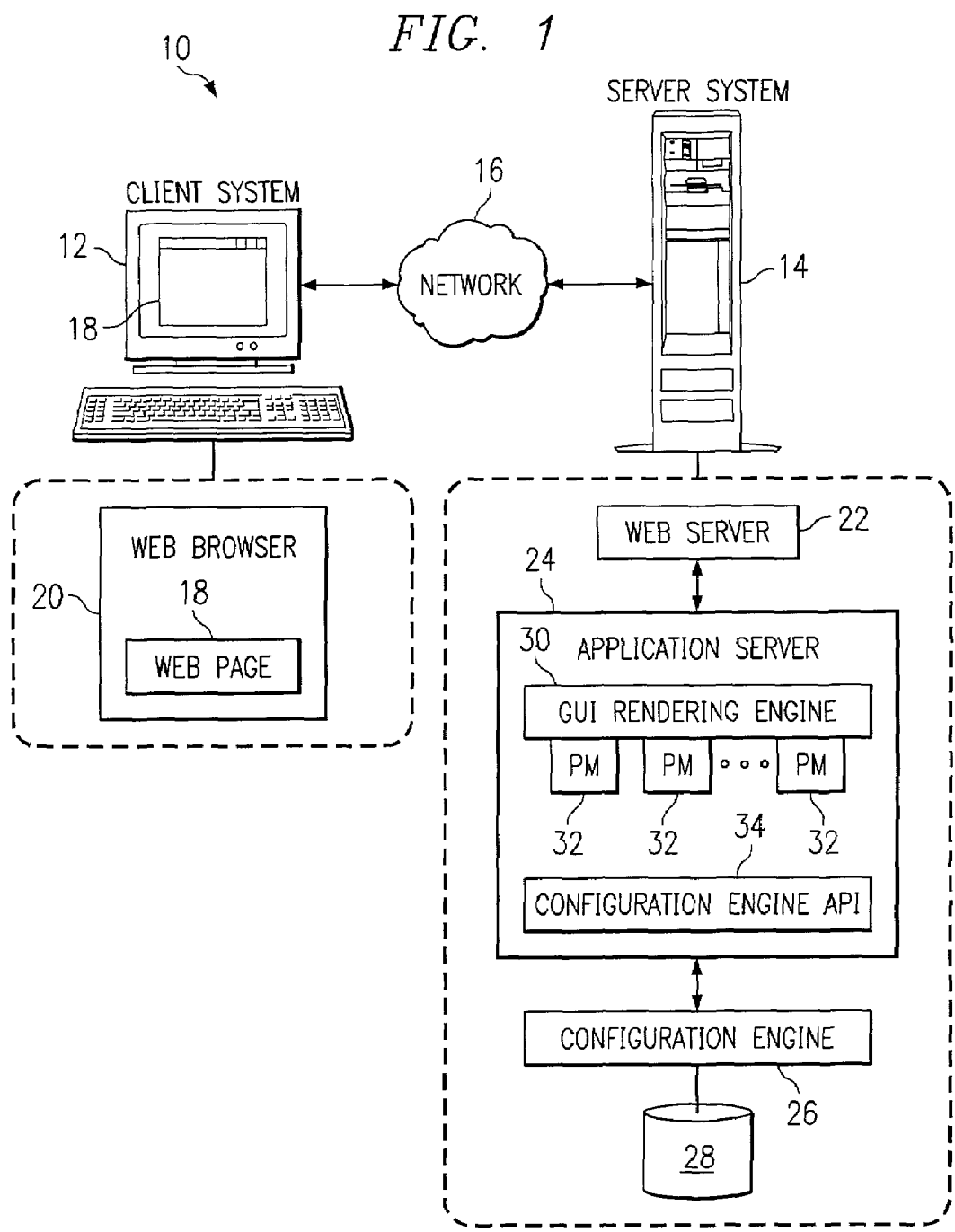
FIG. 1 illustrates an example system for automatically generating GUI elements at a client system according to a current configuration model.

FIG. 1 illustrates an example system 10 that incorporates connectors to allow GUI elements to be automatically updated at a client system according to an updated state of a configuration, which may be a product configuration in certain embodiments. System 10 includes one or more client systems 12 and one or more server systems 14 coupled using a network 16. Client system 12 may be any system that accesses web pages 18 containing product configuration content associated with server system 14 according to input from one or more associated users. Server system 14 may be associated with one or more websites, electronic marketplaces, or any other systems providing web pages 18 containing product configuration content to one or more client systems 12. Client system 12 and server system 14 each operate on one or more computers at one or more locations. Each computer may include one or more suitable input devices, output devices, processors and associated memory, mass storage media, communications interfaces, and any other components that may be appropriate according to operation of system 10. Network 16 may include one or more local area networks (LANs), metropolitan area networks (MANs), wide area networks (WANs), portions of the global computer network known as the Internet, or any other appropriate wireline, optical, wireless, or other links.

Client system 12 includes a web browser 20 that receives web pages 18 from server system 14, displays viewable frames of web pages 18 to one or more users of client system 12, supports "hidden" or other unviewable portions of web pages 18, and executes code associated with web pages 18 as appropriate during operation of system 10. Server system 14 includes components suitable to generate, render, and communicate web pages 18 containing product configuration content from the server system 14 to client system 12, in the form of Hypertext Markup Language (HTML) pages, Extensible Markup Language (XML) pages, or in any other appropriate web-based format. Although web pages 18 are primarily described, the present invention contemplates any suitable page, file, document, or other data representation. Where appropriate, reference to a web page 18 is intended to encompass all suitable data representations and should not be construed to limit the scope of the invention to a particular data representation. Furthermore, reference to web page 18 or a viewable frame of a web page 18 is intended, where appropriate, to include the displayed image of web page 18 (in a browser window of client system 12 for example) in addition to underlying HTML, XML, or other code used in generating the displayed image of web page 18.

Components of server system 14 may include a web server 22, an application server, 24, a configuration engine 26, and a configuration database 28. In general, web server 22 receives Hypertext Transfer Protocol (HTTP) or other requests from client system 12, recognizes these requests as requests for a GUI rendering engine 30 of application server 24, and communicates the requests to application server 24. In one embodiment, application server 24 includes a JRun application server and GUI rendering engine 30 includes a Java servlet executing within a Java Virtual Machine (JVM).

Upon receiving a Java servlet request from web server 22, indicating that the request is intended for GUI rendering engine 30, application server 24 invokes GUI rendering engine 30 accordingly. GUI rendering engine 30 may have one or more associated plug-in process modules 32, written in Java or other appropriate code, used to control and execute various configuration workflow tasks. For example, one or more process modules 32 may request configuration data from configuration engine 34 based on the request from client system 12. In one embodiment, configuration engine 26 includes a C++ server and an appropriate configuration engine application program interface (API) 34 is needed to translate between process modules 32 (Java code) and the configuration engine 26 (C++ code). Configuration engine API 34 and configuration engine 26 may communicate using Common Object Request Broker Architecture (CORBA) or in any other appropriate manner.

In response to a request for configuration data from a process module 32 through configuration engine API 34, configuration engine 26 accesses configuration database 28 and returns the requested configuration data to the requesting process module 32 through configuration engine API 34. The returned configuration data may represent the current state of the configuration with respect to an underlying product configuration model, described more fully below with reference to FIG. 2. Based on the returned configuration data, GUI rendering engine 30 determines the web page content to be generated, rendered, and returned to client system 12, GUI rendering engine 30 communicates this web page content to web server 22, and web server 22 communicates this web page content to client system 12 in the form of an HTTP or other response. In this manner, user input indicating a desire to initiate a configuration workflow may be communicated to server system 14 and configuration data reflecting an initial state of the configuration returned to client system 12. In the same manner, user input in configuring a product during the configuration workflow, such as selecting one of a number of available alternatives in connection with some configuration choice, may be communicated to server system 14 and configuration data reflecting the updated state of the configuration returned to client system 12. In either case, data reflecting the current state of the configuration is returned to client system 12. Although product configuration is primarily described, those skilled in the art will appreciate that the present invention is similarly applicable to any appropriate configuration workflow.

Figure 2:
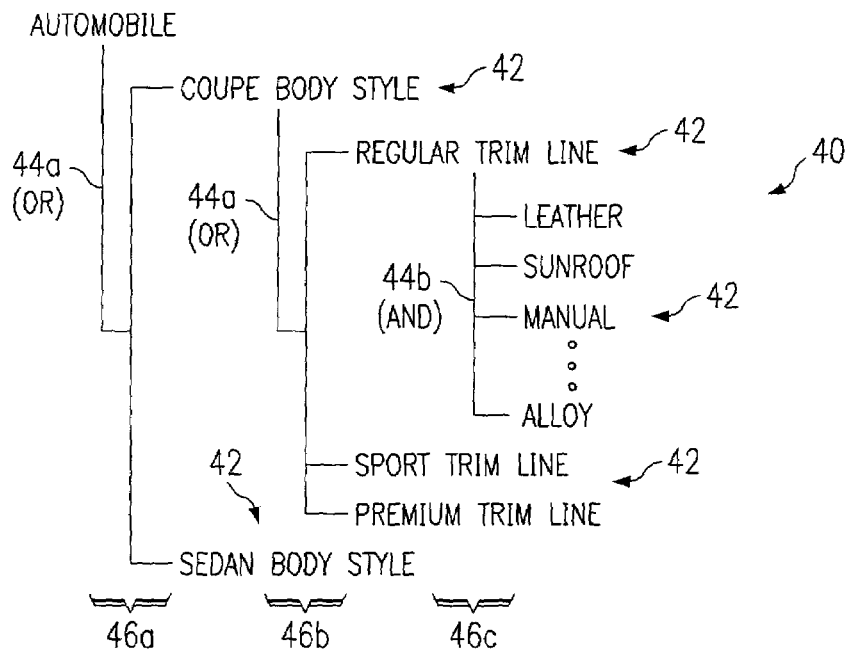
FIG. 2 illustrates an example product configuration model.

FIG. 2 illustrates a portion of an example product configuration model 40 contained in configuration database 28. Configuration database 28 may contain one or more product configuration models 40, for example, one for each product that may be configured using a client system 12. Configuration model 40 may be defined manually using one or more software tools or in any other manner. Configuration model 40 models configuration rules that may apply to the corresponding product, specifying relationships between various configuration elements 42 that a user may select in configuring the product. For example, for the automobile in the previous example, such elements 42 may include body styles, trim lines, options, or any other suitable elements 42. Configuration model 40 may also include any other suitable information that may be relevant to a configuration workflow for the corresponding product. For example, configuration model 40 may specify acceptable values for properties of elements 42, macros to be executed during a configuration workflow in association with certain elements 42, or any other suitable information.

The relationships between configuration elements 42 in configuration model 40 may include OR relationships, which specify that only one of multiple elements 42 can be selected (e.g., either a coupe or a sedan body style for a particular make and model of automobile), and AND relationships, which specify that zero or more of multiple elements 42 can be selected (e.g., a list of available options for a coupe body style and a regular trim line). Where configuration model 40 is in the form of a multi-level hierarchical tree data structure as shown in FIG. 2, each element 42 may represent a node within the data structure and may have an associated branch 44 emanating from its node. Branches 44 corresponding to OR relationships may be referred to as OR branches 44a and branches 44 corresponding to AND relationships may be referred to as AND branches 44b. Elements 42 in configuration model 40 may be arranged in any number of levels 46, each generally corresponding to a set of one or more branches 44. For example, in the illustrated example, an OR branch 44a corresponding to selection of either a coupe or a sedan body style may be at a first level 46a, an OR branch 44a corresponding to selection of either a regular, sport, or premium trim line for the coupe body style may be at a second level 46b, and an AND branch 44b corresponding to selection of zero or more available options for the coupe body style and regular trim line may be at a third level 46c. Although particular elements 42, branches 44, and levels 46 are illustrated and described as examples in connection with example configuration model 40, any suitable configuration model 40 may be created according to particular needs.

The current state of the product configuration may include any information relating to configuration model 40, including the elements 42 the user has selected thus far in configuring the product and any other information describing how those selected elements 42 correspond to the structure of configuration model 40 and to one or more other, possibly non-selected, elements 42 in configuration model 40. For example, the configuration state may include such information as which elements 42 the user selected at the current or previous levels 46, the order in which elements 42 were selected, the nodes to which selected elements 42 correspond, branches 44 in which selected elements 42 reside, whether branches 44 containing selected elements 42 are OR branches 44a or AND branches 44b, the number of elements 42 within a branch 44 containing a selected element 42, the current level 46, which branches 44 correspond to the current level 46, how many elements 42 are nodes on each branch 44 at the current level 46, whether each branch 44 at the current level 46 is an OR branch 44a or an AND branch 44b, the number of elements 42 in each branch 44 at the current level 46, or any other information describing the current configuration state with respect to configuration model 40.

Figure 3:
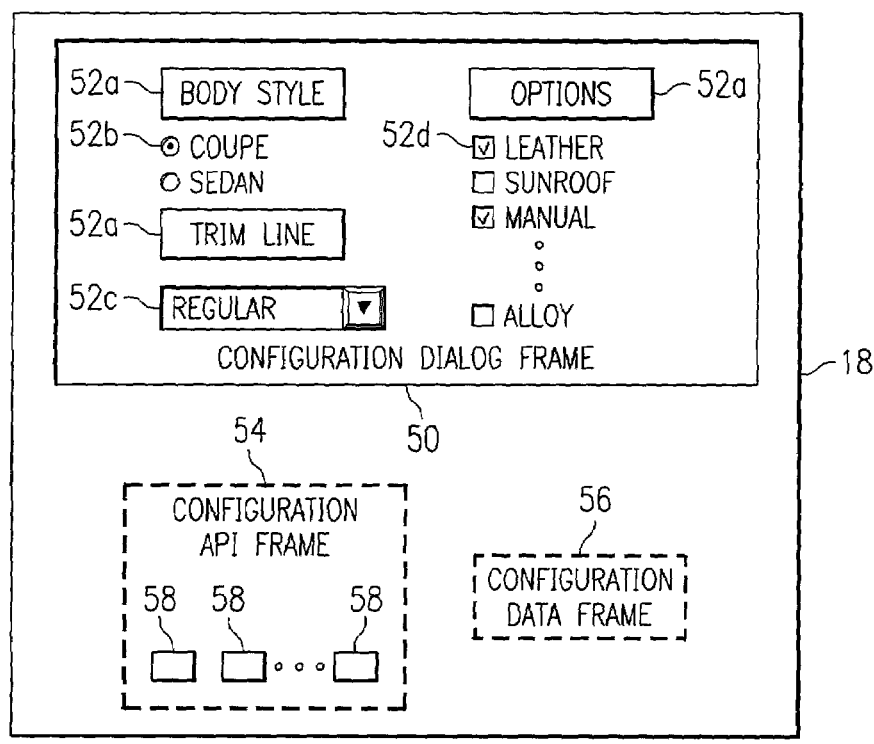
FIG. 3 illustrates an example web page including frames supporting the automatic generation of GUI elements at a client system according to a current configuration model.

FIG. 3 illustrates an example web page 18 including frames supporting the use of connectors to automatically update GUI elements at a client system 12 according to a current state of a configuration, which may be a product configuration in certain embodiments. Web page 18 includes one or more viewable configuration dialog frames 50 that each contain one or more GUI elements 52 that correspond to selections to be made in configuring a product. GUI elements 52 may include text labels 52a, input controls such as radio buttons 52b and drop-down list boxes 52c, and check boxes 52d as shown in FIG. 3, or any other suitable GUI elements 52, such as text fields, text areas, or images. Configuration dialog frame 50 may include one or more dynamic HTML (DHTML) layers, each of which may be associated with one or more GUI elements 52 such that a change to a DHTML layer may affect all GUI elements 52 associated with that DHTML layer.

Web page 18 includes one or more "hidden" or otherwise non-viewable frames that support the communication of user input between client system 12 and server system 14 and, among certain other operations, automatic generation of GUI elements 52 at client system 12 according to configuration model 40, automatic updating of GUI elements 52 at client system 12 according to an updated configuration state, or both. Hidden frames of web page 18 may include a configuration API frame 54 and a configuration data frame 56. Although frames are primarily described, the present invention contemplates any viewable or non-viewable components executing on client system 12 in connection with web page 18 to provide the described functionality. In a particular embodiment, frames of web page 18 may be JavaServer Pages (JSPs) that include JavaScript code to be executed when appropriate. For example, JavaScript code may be associated with each GUI element 52 in configuration dialog frame 50, such that user input with respect to a GUI element 52 causes the associated JavaScript code to be executed. JavaScript code executing within one frame may call a JavaScript function in another frame to communicate with the other frame and cause the other frame to perform appropriate operations.

In one embodiment, hidden configuration API frame 54 of web page 18 is constructed at application server 24 so as to include appropriate configuration data from configuration database 28 and one or more JavaScript or other API functions that operate on that configuration data. Being hidden from view of a user of client system 12, configuration API frame 54 may operate without the knowledge of the user. Configuration API frame 54 may include one or more connectors 58 that are each generated at client system 12 to provide an active link, on the client side within configuration API frame 54, between a particular property associated with a particular configuration element 42 in configuration model 40 (such as the name, description, state, price, or visibility of the configuration element 42) and a particular target GUI element 52 in configuration dialog frame 50. Such connectors 58 may be used in connection with text labels 52a, input controls such as radio buttons 52b or drop-down list boxes 52c, and check boxes 52d as shown in FIG. 3, or any other suitable GUI elements 52, such as text fields, text areas, or images. As described above, each GUI element 52 may be associated with a DHTML layer of configuration dialog frame 50 and one or more GUI elements 52 may be associated with the same DHTML layer. Other connectors 58 may be generated at client system 12 to provide an active link, on the client side within configuration API frame 54, between other elements. For example, a connector 58 might provide a link between an HTML layer content GUI element 52 and a JavaScript or other function, between an HTML layer property GUI element 52 and a JavaScript or other function, or between a JavaScript or other function and a callback to refresh or otherwise update the state of the configuration by communicating user input to server system 14 and receiving an updated state of the configuration from server system 14 in response.

Configuration data representing the current state of the product configuration may be maintained on the client side in configuration API frame 54 and, in response to a change in configuration state based on user input, connectors 58 may allow the change to be reflected in one or more GUI elements 52 automatically and without redrawing configuration dialog frame 50 in its entirety. In one embodiment, when a user makes a configuration selection in connection with a GUI element 52, one or more connectors 58 stored within configuration API frame 54 and each providing an active link between an aspect of the GUI element 52 (e.g., HTML layer content or an HTML layer property) and a JavaScript or other target function within configuration API frame 54 may be used to automatically call the target functions to indicate the user selection. In response, a connector 58 stored within configuration API frame 54 and linking the called function to a callback may be used to automatically refresh or otherwise update the current state of the configuration by communicating the user selection to server system 14 and receiving configuration data reflecting the updated configuration state from server system 14 in response. When configuration data reflecting the updated configuration state is received from server system 14, one or more connectors 58 stored within configuration API frame 54 and each linking a property of a configuration element 42 to a target GUI element 52 may be used to automatically update the one or more target GUI elements 52 to reflect the change. Although several types of connectors 58 are described, certain embodiments of the present invention may include only certain types of connectors 58. For example, the present invention contemplates configuration API frame 54 including connectors 58 linking GUI elements 52 to properties of configuration elements 42 whether or not other types of connectors 58 are supported.

According to the use of connectors 58 linking GUI elements 52 to properties of configuration elements 42, any GUI elements 52 not affected by the configuration state change need not be updated. This may reduce consumed bandwidth since only the information needed to update web page 18 must be communicated over network 16, may decrease flickering or blank displays since web browser 20 may redraw only the portion of configuration dialog frame 50 to be updated rather than in its entirety, may allow the user to continue viewing the same portion of configuration dialog frame 50 (which may be much longer than the browser window) without scrolling down from the top of an entirely new configuration dialog frame 50 after providing input, may reduce delay for any of the preceding reasons, and may provide one or more other benefits over implementations in which a viewable frame must be generated at server system 14, communicated to client system 12, and redrawn in its entirety to reflect configuration state changes. Connectors 58 in configuration API frame 54 may allow web page 18 to remain current with respect to even a complex configuration state without requiring an updated configuration state to be coded in a static web page at server system 14 and communicated with the static web page in its entirety to client system 12.

After a GUI element 52 is initially generated, the JavaScript code associated with GUI element 52 may call one or more JavaScript API functions of configuration API frame 54 to create in configuration API frame 54 one or more connectors 58, for example, between GUI element 52 and one or more properties of one or more related configuration elements 42, one connector 58 for each property. Configuration API frame 54 may include a separate JavaScript API function for each type of connector 58 that may be created, such that the JavaScript code associated with a GUI element 52 may call a different JavaScript API function depending on the type of connector 58 that is to be created. Once created, a connector 58 preferably remains active until the connector 58 is removed, for example, after its target GUI element 52 is replaced with another GUI element 52 (e.g., due to a change in configuration model 40) or after the product has been fully configured and configuration dialog frame 50 is closed. In one embodiment, configuration dialog frame 50 may be a JSP created manually when configuration model 40 is manually defined. In this case, JavaScript code associated with GUI elements 52 that calls JavaScript API functions within configuration API frame 54 to create connectors 58 may be included in the JSP when the JSP is originally generated at application server 24. Alternatively, and more preferably, the calling JavaScript code associated with GUI elements 52 is generated automatically at runtime on the client side within web browser 20.

For example, where functionality for automatically generating GUI elements 52 at runtime is not provided, JavaScript code in configuration dialog frame 50 may use the following code to call a JavaScript API function in configuration API frame 54 to create a connector 58 linking a name property of a "TMP511" configuration element 42 to a text label GUI element 52 (in a document.Dialog.SystemType-Label DHTML layer) for a "System Type" configuration choice:

```
function init( )
{
    //Make sure API is ready
    if(checkAPIReady( ) == true)
    {
        //Add one or more connectors here
        var dialogName = "Customer Needs Analysis",
        connectToBoxNameAsLayer(dialogName, ["Dialog", "System TypeLabel"], "TMP511",
"<span class='ConfigLabel'>?</span>");
    }
    else
    {
        //Wait specified time and check again
        wait (500)
    }
}
```

As additional examples, the following additional code in configuration dialog frame 50 may be used to create multiple connectors 58: (1) linking a name property of a "TMP439" configuration element 42 to a text label GUI element 52 (within a document.Dialog.SystemType1 DHTML layer) for a "System Type 1" selection, (2) linking a state property (e.g., selected or unselected) of the "TMP439" configuration element 42 to a radio button GUI element 52 (in the document.Dialog.SystemType1 layer) for the "System Type 1" selection, and (3) also linking the state property of the "TMP439" configuration element 42 to the document.Dialog.SystemType1 layer to allow the layer (including its label and radio button) can be hidden according to the state of the "TMP439" configuration element 42:

```
connectToBoxNameAsLayer(dialogName, ["Dialog", "System
    Type1", "SystemType1Label"],
"TMP439", "<span class='ConfigLabel'>?</span>");
    connectToBoxStateAsInput(dialogName, ["Dialog", "System
    Type1", "System Type1Form",
"SystemTypeRadioButton1"], null, "TMP439");
    connectToBoxStateAsLayer(dialogName, ["Dialog", "System
    Type1"], "TMP439");
```

As another example, instead of the last connector 58 set forth above (to hide the layer based on the state property of configuration element 42), another connector 58 may be created to link a visibility property (e.g., hidden or not hidden) of the configuration element 42 to the layer to allow the layer (including its label and radio button) can be hidden according to the visibility of the configuration element 42:

```
connectToBoxVisibilityAsLayer(dialogName, ["Dialog", "System
    Type1"], "TMP439");
```

Analogous or different connectors 58 may be created for each configuration choice (e.g., trim line) and each available selection (e.g., regular, sport, or premium) associated with configuration dialog frame 50. Although example code is provided for purposes of illustration, those skilled in the art will appreciate that any suitable code in any suitable programming language may be used according to the particular implementation.

In one embodiment, for increased flexibility, a format string may be included as a parameter in code used to create a connector 58 linking a GUI element 52 to a configuration element property. For example, consider the example code

```
connectToBoxNameAsLayer(dialogName, ["Dialog", "System
    TypeLabel"], "TMP511",
"<span class ='ConfigLabel'>?</span>")
``` linking a DHTML layer GUI element 52 (which may include one or more other GUI elements 52 such as text labels 52a, radio buttons 52b, drop-down list boxes 52c, check boxes 52d and the like) to a name property of the "TMP511" configuration element 42. In this code, the parameter "<span class='ConfigLabel'>?</span>" may be included to allow for formatting in connection with the DHTML layer GUI element 52 for this connector 58, in this case formatting associated with the way the name is displayed.

Instead or in addition to one or more parameters, such a format string may include JavaScript or other code, as in this example:

```
connectToBoxNameAsLayer(dialogName, ["Dialog",
    "TractionButton2",
"TractionButton2Label"], "TMP539", "eval(\"(getBoxObjectByCode
('TMP539').getState( ) ==DISABLE ||
getBoxObjectByCode('TMP539').getState( )
==RELATION_DISABLE)?'<p class=ConfigDisabled>?</p>':'<p
class=ConfigEnabled>?</p>\")");
```

In this case, the format string allows the updated configuration state to be determined in response to user input associated with the DHTML layer GUI element 52 and, if appropriate, a different HTML class to be used in displaying the name depending on whether the name property for the "TMP539" configuration element 42 is enabled or disabled in configuration model 40. In one embodiment, any information associated with any configuration element 42 specified in a format string of the type described above can be obtained and used.

In certain embodiments, instead of or in addition to connectors 58 of the type set forth above, which each link a GUI element 52 to a property of a configuration element 42, certain other types of connectors 58 may be created in configuration API frame 54 to link an HTML layer content GUI element 52 to a JavaScript or other function (e.g., connectContentToFunction), created to link an HTML layer property GUI element 52 to such a function (e.g., connectPropertyToFunction), or created to link such a function to a callback to update the configuration state by communicating user input to server system 14 and receiving an updated state of the configuration from server system 14 in response (e.g., connectCallbackToRefresh). Determining the updated configuration state in response to a configuration selection may require use of such connectors 58 in these embodiments, although as described above other embodiments may lack such connectors 58 or lack any connectors 58.

To provide an example where functionality for automatically generating GU elements 52 at runtime is provided, the following JavaScript code in configuration dialog frame 50 may be used to call one or more JavaScript API functions within configuration API frame 50 to create a connector 58 that renders a text label GUI element 52a:

```
<%
/*
 * When called, Init method makes connections between HTML
   elements and configurator
API to enable dynamic content from configurator to this page.
 */
%>
function init( )
{
//Make sure API is ready
    if(checkAPIReady( ) == true)
    {
        //Show first page
        setPage(0),
        connectCallbackToRefresh("AutoUICallback", "autorefresh( )");
    }
    else
    {
        //Wait specified time and check again
        wait (500);
    }
}
<%
/*
 * Creates a connector that renders a label
 * @param string boxCode
 * @param line Line index
 * @param level box level in tree
 * @param uri box URI
 */
%>
function renderLabel(box Code,line,level,uri)
{
    //description
    var style = "<span class='ConfigLabel'>
    <a href='#'onMouseOver='showDescription
(\\\""+boxCode+"\\\");'>?</a></span>":
    //No description
    //var style = "<span class='ConfigLabel'>?</span>";
    //If URI exists use it instead of code
    if(uri!=null&&uri!="")
    {
        boxCode=uri;
    }
    writeHtmlToLabel("",line,level);
    connectToBoxNameAsLayer("AutoUI", ["uiLayer", ("Line"+line)],
    boxCode, style);
}
```

The following additional example code may be used to create a connector 58 that renders a radio button GUI element 52b and writes it to an associated DHTML layer:

```
<%
/*
 * Creates a connector that renders a radio button and writes that to
layer
 * @param string boxCode
 * @param string Radio Group
 * @param line Line index
 * @param level box level in tree
 * @param uri box URI
 */
%>
function renderRadiobutton(boxCode,group,line,level,uri)
{
    //If URI exists use it instead of code
    if(uri!=null&&uri!="")
    {
        boxCode=uri;
    }
        var radiobutton="<form name=\"radiobuttonform"+line;
        radiobutton += "\" id=\"radiobuttonform"+line+"\">";
        radiobutton += "<input class=\"Configradiobutton\"
        type=\"radio\"
    name=\"radiobutton"+line;
        radiobutton += "\" id=\"radiobutton"+line+"\"
        value=\""+boxCode+"\"
    onClick=\"handleClick(this,RadioGroups["+group+" );\">";
        radiobutton += "</form>";
        writeHtml(radiobutton,line,level);
        if(RadioGroups[group]==null)
        {
            rgroup=new Array( );
            RadioGroups[group]=rgroup;
        }
        if(isBrowserIE4( ))
        {
            rgroup[rgroup.length] = "document.all.radiobutton"+line;
        }
        if(isBrowserNS4( ))
        {
            rgroup[rgroup.length] =
"document.uiLayer.document.Line"+line+".document.radiobuttonform"+
line+".radiobutton"+line;
        }
        if(isBrowserNS6( ))
        {
            rgroup[rgroup.length] = document.getElementById
            ('radiobutton'+line);
        }
        //alert(radiobutton);
        connectToBoxNameAsLayer("AutoUI", ["uiLayer",
        ("buttonlabel"+line)], boxCode,
"<span class='ConfigRadioButton'>?</span>");
        connectToBoxStateAsLayer("AutoUI", ["uiLayer",
        ("Line"+line)],boxCode);
        connectToBoxStateAsInput("AutoUI", ["uiLayer",
        ("Line"+line) ,("radiobuttonform"+line)
,("radiobutton"+line)], null, boxCode);
}
```

The following additional example code may be used to create a connector 58 that renders a drop-down list box GUI element 52c and writes it to an associated DHTML layer:

```
<%
/*
 * Creates a connector that renders a drop-down list and writes that to
layer
 * @param Array boxCodes
 * @param line Line index
 * @param level box level in tree
 * @param uris Array of box URIs
 */
%/
function renderSingleSelectList(boxCodes,line,level,uris)
{
```

*-continued*

```
    //If URI array exists use it instead of code array
    if(uris!=null&&uris.length>0)
    {
        boxCodes=uris;
    }
    var functions new Array(boxCodes.length);
    var listbox="<form name=\"listform"+line+"\"
    id=\"listform"+line+"\">";
    listbox += "<select class=\"ConfigComboBox\"
    ID=\"list"+line+"\" width=\"200\"
name=\"list"+line+"\" size=\"1\" onChange=\"handleClick(this, null);\">";
    for(var i=0;i<boxCodes.length;i++)
    {
        functions [i] = "getName( )";
        listbox += "<option></option>";
    }
    listbox += "</select></form>";
    writeHtml(listbox,line,level);
    buildSelectBox("AutoUI", ["uiLayer" ,("Line"+line),
("listform"+line),("list"+line)],boxCodes,functions);
    connectToBoxStateAsInput("AutoUI", ["uiLayer" ,("Line"+line),
("listform"+line),("list"+line)], null, null);
    //Hide listbox if no selectable items in it
    connectToBoxStatesAsLayer("AutoUI", ["uiLayer" ,("Line"+line),
("listform"+line),("list"+line)],boxCodes);
}
```

The following additional example code may be used to create a connector 58 that renders a check box GUI element 52d and writes it to an associated DHTML layer:

```
<%
/*
 * Creates a connector that renders a check box and writes that to
layer
 * @param string boxCode
 * @param line Line index
 * @param level box level in tree
 * @param uri box URI
 */
%>
function renderCheckbox(boxCode,line,level,uri)
{
    //If URI exists use it instead of code
    if(uri!=null&&uri!="")
    {
        boxCode=uri;
    }
        var checkbox="<form name=\"checkboxform"+line;
        checkbox += "\" id=\"checkboxform"+line+"\">";
        checkbox += "<input class=\"ConfigCheckBox\"
        type=\"checkbox\"
    name=\"checkbox"+line;
        checkbox += "\" id=\"checkbox"+line+"\"
        value=\""+boxCode+"\"
    onClick=\"handleClick(this, null);\">";
        checkbox += "</form>";
        writeHtml(checkbox,line,level);
        connectToBoxNameAsLayer("AutoUI", ["uiLayer" ,
        ("buttonlabel"+line)], boxCode,
"<span class='ConfigCheckBox'>?</span>");
        connectToBoxStateAsLayer("AutoUI", ["uiLayer" ,
        ("Line"+line)], boxCode);
        connectToBoxStateAsInput("AutoUI", ["uiLayer"
,("Line"+line),("checkboxform"+line),("checkbox"+line)], null, boxCode);
}
```

Analogous or different connectors 58 may be created for each type of GUI element 52 that may be associated with a configuration dialog frame 50. Although example code is provided for purposes of illustration, those skilled in the art will appreciate that any suitable code in any suitable programming language may be used according to the particular implementation.

In one embodiment, GUI elements 52 displayed in configuration dialog frame 50 are generated automatically at runtime using JavaScript code or other logic within configuration API frame 54, for example, in response to the user indicating a desire to initiate a workflow to configure a product. This may allow GUI elements 52 that are to be displayed to the user in connection with the initiated workflow to be modified automatically according to changes in the underlying configuration model 40, such that displayed GUI elements 52 reflect the current configuration model 40, without requiring a maintainer of an associated website to manually change a configuration GUI to reflect these changes. JavaScript code in configuration dialog frame 50 may allow configuration dialog frame 50 to draw (e.g., upon initiation of the workflow or changes to configuration model 40 during the workflow) all or a part of itself within web browser 20. For example, such code may draw one or more GUI elements 52 after receiving information from configuration API frame 54 as to the configuration choices for which GUI elements 52 need to be drawn according to the current configuration model 40. In one embodiment, JavaScript code within configuration dialog frame 50 calls a JavaScript API function in configuration API frame 54, the called JavaScript API function accesses configuration data stored in configuration API frame 54 reflecting the current configuration model 40, and the called JavaScript API function returns the desired information in the form of a callback to the calling JavaScript code. It may be desirable in certain embodiments to allow functionality for automatically generating GUI elements 52 to be enabled or disabled according to particular needs, for example, by modifying the called JavaScript API function in configuration API frame 54.

If the frameset associated with web page 18 includes multiple configuration dialog frames 50 (e.g., each representing a different subdialog for a different portion of the configuration), such that the user can switch between these open configuration dialog frames 50 in configuring the product, the GUI elements 52 displayed in one configuration dialog frame 50 may be automatically modified to reflect user input with respect to GUI elements 52 in any other configuration dialog frame 50. For example, within a single browser window, the user might view a first configuration dialog frame 50 along the top of the window displaying the price of the product being configured, a second configuration dialog frame 50 along the left side of the window for navigating between different configuration dialogs (e.g., different dialogs for the cabin, chassis, engine, transmission, and exhaust of an automobile being configured), a third configuration dialog frame 50 along the right side of the window displaying a summary of all configuration elements 42 selected thus far, a fourth configuration dialog frame 50 along the bottom of the window displaying a text description (e.g., associated with a certain configuration choice), and a fifth configuration dialog frame 50 in the center of the window for the configuration dialog itself (i.e. displaying the configuration choices to the user and receiving user input using GUI elements 52). Connectors 58 stored in configuration API frame 54 will preferably maintain active links between properties of configuration elements 42 and target GUI elements 52 regardless of the number of open configuration dialog frames 50.

Parameters determining how GUI elements 52 should be displayed may be stored within configuration dialog frame 50, for example, as JavaScript code where configuration dialog frame 50 is a JSP. For example, a GUI element 52 for receiving user input selecting a configuration element 42 may depend on whether the element 42 is in an OR branch 44 or an AND branch 44 within configuration model 40. One or more parameters in configuration dialog frame 50 may specify that if elements 42 are in an OR branch 44a, then input controls such as radio buttons or drop-down list boxes should be displayed to restrict the user from selecting more than one element 42, but if elements 42 are instead in an AND branch 44b, then check boxes should be displayed instead. As another example, a GUI element 52 for receiving user input selecting a configuration element 42 associated with an OR branch 44a may depend on the number of elements 42 available to select. One or more parameters within configuration dialog frame 50 may specify that if only two elements 42 are available, then radio buttons should be displayed, but if at least three elements 42 are available, then a drop-down list box should be displayed instead. As yet another example, a GUI element 52 for receiving user input selecting a configuration element 42 may depend on the level 46 at which the available element 42 exists within configuration model 40. One or more parameters in configuration dialog frame 50 might specify that if available elements 42 are at a first level 46a, then a text label should be displayed with input controls such as radio buttons or a drop-down list box, but if the available elements 42 are at a second level 46b, then no text label should be displayed. Parameters described above are provided as examples for purposes of illustration. The present invention contemplates GUI elements 52 being displayed according to any suitable parameters, singly or in any suitable combination, relating to product configuration model 40. In one embodiment, subsequent to receiving a callback from a JavaScript API function in configuration API frame 54 containing information as to the one or more configuration choices for which GUI elements 52 should be drawn, JavaScript code in configuration dialog frame 50 causes appropriate GUI elements 52 to be drawn within web browser 20 according to parameters stored within configuration dialog frame 50.

Unlike static web pages associated with previous techniques, which must be individually generated on the server side using a discrete configuration GUI that is closely associated with a configuration engine, certain embodiments of the present invention allow web page 18 (including its constituent frames and their components) to behave at client system 12 as an active configuration GUI for configuration engine 26. In previous systems, if a configuration model is changed to reflect a real-world change (e.g., the unavailability of the sport trim line for a particular make and model of automobile in the previous example), a maintainer of the website will be required to manually change the configuration GUI associated with the configuration engine such that alternatives (e.g., for trim line, reduced from three to two in the previous example) are presented differently (e.g., using radio buttons instead of a drop-down list box) where such a change is desired. This may increase costs associated with maintaining the website, delay implementation of changes to the configuration GUI, and decrease user satisfaction due to display of less appropriate GUI elements. In contrast, in certain embodiments of the present invention, a change to configuration model 40 may automatically result in corresponding changes to one or more GUI elements 52 displayed, according to parameters stored in configuration dialog frame 50. Thus, if configuration model 40 is changed to reflect a real-world change (e.g., the unavailability of the sport trim line in the previous example), then a maintainer of the website would not be required to manually implement changes (e.g., such that the alternatives for trim line would be presented to users using radio buttons instead of a drop-down list box). As a result, certain embodiments of the present invention may decrease costs for maintaining an electronic marketplace or other website, may speed implementation of configuration GUI changes, and increase user satisfaction due to display of more appropriate GUI elements 52, making the invention well suited for modern electronic commerce environments.

For example, the following JavaScript code in configuration dialog frame 50 may be used to call a JavaScript API function in configuration API frame 54 when configuration dialog frame 50 is loaded at web browser 20 to enable the automatic generation of GUI elements 52 at runtime:

```
<%
/*
    * Calls init function when page is loaded. Init function enables dyna-
mic content from configurator to this page.
    */
%>
<body topmargin="1" leftmargin="1" onLoad="addPostHandler(this);
window.setTimeout('init( );', 200);" on UnLoad="removePostHandler
(this);
deleteConnection('AutoUI');">
```

As another example, the following JavaScript code in configuration dialog frame 50 may be used to call a JavaScript API function in configuration API frame to check whether any changes to configuration model 40 have occurred that would require one or more new GUI elements 52 to be drawn, possibly to replace one or more existing GUI elements 52:

```
<%
/*
    * Check if there are dynamic changes in configuration model (i.e
added or removed boxes) so that UI must be redrawn
    */
%>
function autorefresh( )
{
    if(isDynamicChanges( ))
    {
        var params = getAutoUIParameters( );
        setPageNoScroll(params.currentPage);
    }
}
```

In one embodiment, hidden configuration data frame 56 of web page 18 is used to communicate HTTP or other requests from client system 12 to server system 14, and to receive corresponding HTTP or other responses from server system 14, in response to user input involving one or more GUI elements 52 within configuration dialog frame 50. As described more fully in copending U.S. application Ser. No. 09/948,500, use of configuration data frame 56 (referred to therein as a "messaging frame") may allow content displayed in configuration dialog frame 50 to be updated in response to such user input automatically without communicating a new web page 18 in its entirety from server system 14 to client system 12. This may reduce the consumed bandwidth since only information needed to update web page 18 must be communicated over network 16, may decrease flickering or blank displays since web browser 20 may update only a portion of configuration dialog frame 50 rather than in its entirety, may reduce delay for either of the preceding reasons, and may provide one or more other benefits relative to implementations in which updating content of a viewable frame requires the viewable frame to itself transmit an HTTP request to server system 14 and receive a corresponding HTTP response from server system 14. In one embodiment, configuration API frame 54 places form data, representing user input associated with configuration dialog frame 50, into configuration data frame 56, which then posts the form data as an HTTP or other request to server system 14. Being hidden from view of a user of client system 12, the configuration data frame 56 may operate without the knowledge of the user. Although configuration data frame 56 is described, the present invention does not require configuration data frame 56 to be included in the frameset associated with web page 18. For example, configuration dialog frame 50 and configuration API frame 54 may perform at least certain operations described above whether or not web page 18 includes configuration data frame 56.

Although particular frames of web page 18 have been described in relation to particular operations, those skilled in the art will recognize that one or more such operations may be performed using other frames or other suitable types of software components. Those skilled in the art will further recognize that certain operations described as being performed by a particular frame may, in other embodiments, be performed by another described frame or by a frame integrating certain functionality associated with two or more described frames.

In operation of system 10, a user associated with a client system 12 provides input indicating a desire to begin a product configuration workflow to configure a product. In response, web browser 20 of client system 12 communicates an HTTP or other request to web server 22 of server system 114, which recognizes the request as a request to GUI rendering engine 30 and forwards the request to application server 24. Application server 24 receives the request and invokes GUI rendering engine 30, which in turn executes one or more of its process modules 32 to satisfy the request. The one or more process modules 32 request configuration data from configuration engine 26 using configuration engine API 34. Configuration engine 26 retrieves the appropriate configuration data from configuration database 28, representing an initial state of the configuration, and returns the retrieved configuration data to the one or more requesting process modules 32 using configuration engine API 34. After the configuration data is appropriately processed at the one or more process modules 32, GUI rendering engine 30 determines the view to be displayed to the user to begin the configuration workflow, according to the returned configuration data, and generates an appropriate frameset for web page 18 accordingly. This frameset may include configuration dialog frame 50, configuration API frame 54, and configuration data frame 56. Application server 24 communicates the frameset for web page 18 to web server 22, which communicates each frame to web browser 20 as an HTTP or other response to the HTTP or other request initially received from web browser 20. The frames are then loaded within web browser 20, substantially simultaneously or in any appropriate order.

In one embodiment, when loaded at web browser 20, configuration dialog frame 50 includes JavaScript code representing parameters that determine how GUI elements 52 should be displayed and JavaScript code used for calling JavaScript API functions within configuration API frame 54. Configuration API frame 54 includes configuration data representing the initial state of the configuration and Java- Script API functions that may be called to perform various operations. Configuration data frame 56 is initially empty. When configuration dialog frame 50 is loaded at web browser 20, JavaScript code within configuration dialog frame 50 calls one or more JavaScript API functions in configuration API frame 54 to determine the one or more configuration choices for which GUI elements 52 need to be displayed. A called JavaScript API function in configuration API frame 54 accesses configuration data within configuration API frame 54, representing the initial state of the configuration, and determines the configuration choices for which GUI elements 52 need to be displayed. The JavaScript API function makes a callback to the calling JavaScript code in the configuration dialog frame 50, requesting configuration dialog frame 50 to draw a GUI element 52 for each appropriate configuration choice. Configuration dialog frame 50 may determine how GUI elements 52 associated with configuration choices should be drawn according to the parameters stored in configuration dialog frame 50. The same or different JavaScript code in configuration dialog frame 50 may then draw the appropriate GUI elements 52 for display, possibly creating one or more, or reusing one or more existing, DHTML layers. Thus, in one embodiment, GUI elements 52 to be displayed are generated automatically at runtime at client system 12 according to parameters stored within configuration dialog frame 50 and configuration data stored within configuration API frame 54 representing the initial state of the configuration.

In one embodiment, when a configuration workflow is initiated, appropriate GUI elements 52 are automatically generated to reflect the underlying configuration model 40, even if configuration model 40 has changed since a previous configuration workflow was initiated for the same or a different user. As just an example, assume that the number of configuration elements 42 available for selection in connection with a particular configuration choice for a first configuration workflow is three, and that the GUI element 52 corresponding to that configuration choice is automatically generated and drawn as a drop-down list box in the manner described above. Next assume that configuration model 40 is changed, according to a business need or for any other reason, such that the number of configuration elements 42 available for selection in connection with that configuration choice decreases from three to two. In one embodiment, if a second configuration workflow is initiated following the change to configuration model 40, and if the parameters stored in configuration dialog frame 50 specify that three or more available alternatives are to be presented using a drop-down list box but two available alternatives are instead to be presented using radio buttons, then the GUI element 52 corresponding to that configuration choice is automatically generated and drawn as a radio button instead of a drop-down list box. This may provide certain technical advantages over previous techniques, in which a configuration GUI must be manually changed to reflect configuration model changes if more appropriate GUI elements 52 are to be displayed, especially where changes to configuration model 40 occur frequently.

After suitable GUI elements 52 are generated for display, configuration API frame 54 may create suitable connectors 58 for GUI elements 52. JavaScript code in configuration dialog frame 50 may call one or more JavaScript API functions within configuration API frame 54 to create connectors 58. The calling JavaScript code in configuration dialog frame 50 for generating GUI elements 52 may be the same as or different than, in whole or in part, the calling JavaScript code in configuration dialog frame 50 for creating connectors 58. One or more called JavaScript API functions used for generating GUI elements 52 may be the same as or different than, in whole or in part, one or more called JavaScript API functions for creating connectors 58. Although JavaScript code and JavaScript API functions are primarily described, the present invention contemplates any appropriate components in configuration dialog frame 50 and configuration API frame 54 to provide the described functionality.

At any time during the configuration workflow, the user may provide input indicating a configuration selection associated with a particular GUI element 52. In response, in one embodiment, JavaScript code within configuration dialog frame 50 associated with GUI element 52 calls an appropriate JavaScript API function within configuration API frame 54, indicating the user selection (or de-selection). The called JavaScript API function prepares a suitable representation of the user selection and inserts the representation into configuration data frame 56. Configuration data frame 56 posts an HTTP or other request to web server 22 of server system 14. Suitable components of server system 14 retrieve and return appropriate configuration data, reflecting the updated state of the configuration, to the web server 22 in the manner described above. Web server 22 posts an HTTP or other response to configuration data frame 56 located at client system 12. The response from server system 14 may include JavaScript or any other suitable code that represents the configuration data and can be automatically executed by configuration API frame 54 to update the configuration choices associated with one or more GUI elements 52. As described more fully above, using hidden configuration data frame 56 for communication with server system 14, rather than a viewable configuration dialog frame 50, may provide technical advantages.

Upon receiving the response from server system 14, configuration data frame 56 provides the returned configuration data to configuration API frame 54. In one embodiment, configuration data frame 56 automatically executes JavaScript code in the response that calls one or more JavaScript API functions in configuration API frame 54 to process the configuration data. A called JavaScript API function stores the configuration data within configuration API frame 54, thereby updating the state of the configuration on the client side. The same or a different called JavaScript API function may also determine one or more configuration choices associated with the configuration data for which one or more GUI elements 52 need to be updated. JavaScript code in the response received from server system 14 may include a JavaScript array identifying configuration choices (reflected in specified configuration elements 42 or otherwise) for which GUI elements 52 need to be updated. In this case, the called JavaScript function in configuration API frame 54 may traverse the array, configuration choice by configuration choice, to determine the GUI elements 52 to be updated. Although JavaScript and JavaScript arrays are described, the present invention contemplates any appropriate code that can be automatically executed at client system 12 when received.

The same or a different called JavaScript API function in configuration API frame 54 may use previously created connectors 58 for the appropriate configuration elements 42 to update their corresponding target GUI elements 52. User input with respect to a GUI element 52, such as user input selecting one of multiple alternative configuration elements 42, may affect not only a GUI element 52 for the selected configuration element 42 but additionally possibly one or more other GUI elements 52 for one or more other configuration elements 42. As just an example, one or more configuration choices may be disabled based on the selection such that visibility properties for associated configuration elements 42 are changed (e.g., from "visible" to "not visible") and the corresponding GUI elements 52 will be hidden. As another example, one or more configuration choices may be enabled based on the selection such that visibility properties for associated configuration elements 42 are changed (e.g., from "not visible" to "visible") and the corresponding GUI elements 52 will be displayed. As another example, one or more name, description, state, price, or other properties for each of one or more configuration elements 42 may be changed based on the selection and the corresponding GUI elements 52 changed accordingly. These are merely examples for purposes of illustration; the present invention contemplates any suitable changes.

FIG. 4 illustrates an example method incorporating the use of connectors to automatically update GUI elements 52 at a client system 12 according to an updated state of a configuration, which may be a product configuration in one embodiment. The method begins at step 100, where a user associated with a client system 12 provides input indicating a desire to begin a product configuration workflow. In response, at step 102, web browser 20 of client system 12 communicates an HTTP or other request to web server 22 of server system 114. At step 104, server system 14 processes the request in the manner described above to generate an appropriate frameset for web page 18. In one embodiment, this frameset includes configuration dialog frame 50, configuration API frame 54, and configuration data frame 56. At step 106, web server 22 communicates each frame to web browser 20 of client system 12 as an HTTP or other response to the HTTP or other request initially received from web browser 20. At step 108, the frames are loaded in web browser 20, substantially simultaneously or in any suitable order.

In one embodiment, at step 110, JavaScript or other code in configuration dialog frame 50 calls one or more JavaScript API or other functions in configuration API frame 54 to determine the one or more configuration choices for which GUI elements 52 are to be displayed. At step 112, a called function in configuration API frame 54 accesses configuration data in configuration API frame 54, representing the initial state of the configuration, and determines these configuration choices. At step 114, the called function makes a callback to the calling code in configuration dialog frame 50, requesting configuration dialog frame 50 to draw a GUI element 52 for each appropriate configuration choice. At step 116, the same or different code in configuration dialog frame 50 determines how the GUI elements 52 associated with these configuration choices should be drawn according to the parameters stored in configuration dialog frame 50. The same or different code in configuration dialog frame 50 may then draw the appropriate GUI elements 52 for display at step 118, possibly using one or more DHTML layers. Accordingly, in one embodiment, GUI elements 52 to be displayed are generated automatically, at runtime, at client system 12 according to parameters stored in configuration dialog frame 50 and configuration data stored within configuration API frame 54 representing the initial state of the configuration.

After suitable GUI elements 52 are generated for display, configuration API frame 54 may create connectors 58 for GUI elements 52. In one embodiment, at step 120, JavaScript or other code in configuration dialog frame 50 may call one or more JavaScript API or other functions in configuration API frame 54 to create connectors 58. In response, at step 122, one or more called function in configuration API frame create appropriate connectors 58. Although creation of connectors 58 is described, the present invention contemplates automatic generation of GUI elements 52 with or without creation of associated connectors 58 as described herein. Conversely, the present invention also contemplates creation of connectors 58 between properties of configuration elements 42 and target GUI elements 52 whether or not GUI elements 52 are automatically generated as described herein.

At any time during the configuration workflow, the user may provide input indicating a configuration selection (or de-selection) associated with a particular GUI element 52 at step 124. In one embodiment, at step 126, JavaScript or other code in configuration dialog frame 50 associated with GUI element 52 calls an appropriate JavaScript API or other function within configuration API frame 54 at step 126 to indicate the user selection. At step 128, the called function prepares and inserts a representation of the user selection into configuration data frame 56, which then posts an HTTP or other request to web server 22 of server system 14 at step 130. Suitable components of server system 14 process the request at step 132 to retrieve appropriate configuration data reflecting the updated state of the configuration. At step 134, web server 22 posts an HTTP or other response to configuration data frame 56 located at client system 12. The response from server system 14 may include JavaScript or any other suitable code that represents the configuration data and can be automatically executed by configuration API frame 54 to update configuration choices associated with one or more GUI elements 52. Although hidden configuration data frame 56 is described and is preferably used in certain embodiments, hidden configuration frame 56 is not necessarily required to practice the present invention.

Upon receiving the response from server system 14, configuration data frame 56 provides the returned configuration data to configuration API frame 54. In one embodiment, at step 136, configuration data frame 56 automatically executes suitable JavaScript or other code in the response to call one or more JavaScript API or other functions in configuration API frame 54 to process the returned configuration data. At step 138, a called function stores the returned configuration data in configuration API frame 54, thereby updating the state of the configuration on the client side. At step 140, the same or a different called function may also determine one or more configuration choices associated with the configuration data for which one or more GUI elements 52 need to be updated. At step 142, the same or a different called function in configuration API frame 54 may use previously created connectors 58 for appropriate configuration elements 42 to update corresponding target GUI elements 52. The present invention contemplates updating target GUI elements 52 in a single or multiple configuration dialog frames 50. If the configuration workflow is not yet completed at step 144, the method returns to step 124 where the user may provide further input indicating a configuration selection (or de-selection). Otherwise, if the configuration workflow is complete at step 144, the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for automatically generating a graphical user interface (GUI) element at a client system according to a current configuration model, comprising:
- a first frame associated with a web page comprising a JavaServer Page (JSP) and generated at a server system for communication to a client system in connection with a configuration workflow, when generated the first frame comprising data reflecting the current configuration model, when generated the first frame further comprising a JavaScript function operable when executed at the client system in response to a call to automatically:
  - receive a configuration choice selection at a first GUI element;
  - access the data stored in the first frame reflecting the current configuration model;
  - according to the accessed data, determine one or more configuration choices for which a second GUI element needs to be drawn for display to a user associated with the client system in connection with the configuration workflow in response to the configuration choice selection of the first GUI element; and
  - make a callback requesting that the second GUI element for the one or more configuration choices be drawn; and
- a second frame associated with the web page comprising a JSP and generated at the server system for communication to the client system in association with the first frame, when generated the second frame comprising one or more parameters specifying the second GUI element that will be appropriate for the one or more configuration choices depending on the current configuration model as reflected in the data stored in the first frame in response to the configuration choice selection, when generated the second frame further comprising a JavaScript code operable when executed at the client system to automatically:
  - call the JavaScript function of the first frame to determine the one or more configuration choices for which the second GUI element needs to be displayed to the user associated with the client system in connection with the configuration workflow;
  - receive a callback from the JavaScript function of the first frame requesting that the second GUI element for the one or more configuration choices be drawn; and
  - according to the one or more parameters stored in the second frame, draw the second GUI element that is appropriate for the one or more configuration choices.

2. The system of claim 1, wherein the second GUI element appropriate for the one or more configuration choices is generated on the fly at the client system.

3. The system of claim 1, wherein the first frame is operable to reflect a change to the configuration model independent of the configuration choice selection at the first GUI element subsequent to the change, the first frame when generated in connection with a configuration workflow initiated before the change comprising data reflecting the configuration model before the change, the first frame when generated in connection with a configuration workflow initiated after the change comprising data reflecting the configuration model after the change.

4. The system of claim 1, wherein the first and second frames belong to a frameset associated with the web page and are communicated to the client system in response to the user initiating the configuration workflow.

5. The system of claim 1, wherein the configuration model is a product configuration model, the configuration workflow is workflow to configure a product, and the one or more configuration choices is associated with one or more available selections for configuring a corresponding portion of the product.

6. The system of claim 1, wherein the second GUI element for the one or more configuration choices is associated with a dynamic Hypertext Markup Language (DHTML) layer and comprises one of a label, a radio button, a drop-down list box, and a check box.

7. The system of claim 1, wherein:
- the first frame comprises a non-viewable configuration application program interface (API) frame; and
- the second frame comprises one of a plurality of viewable configuration dialog frames associated with the web page.

8. The system of claim 1, wherein the second frame is operable to cause a connector to be created for the second GUI element for the one or more configuration choices in response to generation of the second GUI element, the connector providing an active link between the second GUI element and a property of a configuration element associated with the configuration choice, the connector allowing the second GUI element to be automatically re-drawn in response to the configuration choice selection during the configuration workflow affecting the property of the configuration element without requiring the second frame to be re-drawn in its entirety at the client system.

9. The system of claim 8, wherein:
- the first frame comprises a plurality of JavaScript functions each operable when executed at the client system in response to a call to create a connector for a corresponding type of GUI element; and
- the second frame comprises JavaScript code associated with the second GUI element for the one or more configuration choices the JavaScript code being generated automatically at runtime at the client system in response to generation of the second GUI element and operable to automatically call the JavaScript function in the first frame corresponding to the type of GUI element to create a connector for the second GUI element.

10. The system of claim 1, further comprising a third frame associated with the web page and generated at the server system for communication to the client system in association with the first and second frames, when executed at the client system the third frame operable to:
- receive from the second frame data representing a configuration choice selection associated with the second GUI element;
- post the data received from the second frame as a Hypertext Transfer Protocol (HTTP) request to the server system;
- receive an HTTP response from the server system comprising data reflecting a current state of a configuration in relation to the configuration model, the current state reflecting the configuration choice selection at the second GUI element; and
- communicate the data received from the server system to the second frame to initiate updating of a third GUI element.

11. The system of claim 1, wherein the system consists of the web page comprising the first and second frames.

12. A method for automatically generating a graphical user interface (GUI) element at a client system according to a current configuration model, comprising:
  generating a first frame associated with a web page comprising a JavaServer Page (JSP) and generated at a server system for communication to a client system in connection with a configuration workflow, when generated the first frame comprising data reflecting the current configuration model, when generated the first frame further comprising a JavaScript function operable when executed at the client system in response to a call to automatically:
    receive a configuration choice selection at a first GUI element;
    access the data stored in the first frame reflecting the current configuration model;
    according to the accessed data, determine one or more configuration choices for which a second GUI element needs to be drawn for display to a user associated with the client system in connection with the configuration workflow in response to the configuration choice selection of the first GUI element; and
    make a callback requesting that the second GUI element for the one or more configuration choices be drawn; and
  generating a second frame associated with the web page comprising a JSP and generated at the server system for communication to the client system in association with the first frame, when generated the second frame comprising one or more parameters specifying the second GUI element that will be appropriate for the one or more configuration choices depending on the current configuration model as reflected in the data stored in the first frame in response to the configuration choice selection, when generated the second frame further comprising a JavaScript code operable when executed at the client system to automatically:
    call the JavaScript function of the first frame to determine the one or more configuration choices for which the second GUI element needs to be displayed to the user associated with the client system in connection with the configuration workflow;
    receive a callback from the JavaScript function of the first frame requesting that the second GUI element for the one or more configuration choices be drawn; and
    according to the one or more parameters stored in the second frame, draw the second GUI element that is appropriate for the one or more configuration choices.

13. The method of claim 12, wherein the second GUI element appropriate for the one or more configuration choices is generated on the fly at the client system.

14. The method of claim 12, wherein the first frame is operable to reflect a change to the configuration model independent of the configuration choice selection at the first GUI element subsequent to the change, the first frame when generated in connection with a configuration workflow initiated before the change comprising data reflecting the configuration model before the change, the first frame when generated in connection with a configuration workflow initiated after the change comprising data reflecting the configuration model after the change.

15. The method of claim 12, wherein the first and second frames belong to a frameset associated with the web page and are communicated to the client system in response to the user initiating the configuration workflow.

16. The method of claim 12, wherein the configuration model is a product configuration model, the configuration workflow is workflow to configure a product, and the one or more configuration choices is associated with one or more available selections for configuring a corresponding portion of the product.

17. The method of claim 12, wherein the second GUI element for the one or more configuration choices is associated with a dynamic Hypertext Markup Language (DHTML) layer and comprises one of a label, a radio button, a drop-down list box, and a check box.

18. The method of claim 12, wherein:
  the first frame comprises a non-viewable configuration application program interface (API) frame; and
  the second frame comprises one of a plurality of viewable configuration dialog frames associated with the web page.

19. The method of claim 12, wherein the second frame is operable to cause a connector to be created for the second GUI element for the one or more configuration choices in response to generation of the second GUI element, the connector providing an active link between the second GUI element and a property of a configuration element associated with the configuration choice, the connector allowing the second GUI element to be automatically re-drawn in response to the configuration choice selection during the configuration workflow affecting the property of the configuration element without requiring the second frame to be re-drawn in its entirety at the client system.

20. The method of claim 19, wherein:
  the first frame comprises a plurality of JavaScript functions each operable when executed at the client system in response to a call to create a connector for a corresponding type of GUI element; and
  the second frame comprises JavaScript code associated with the second GUI element for the one or more configuration choices the JavaScript code being generated automatically at runtime at the client system in response to generation of the second GUI element and operable to automatically call the JavaScript function in the first frame corresponding to the type of GUI element to create a connector for the second GUI element.

21. The method of claim 12, further comprising generating a third frame associated with the web page at the server system for communication to the client system in association with the first and second frames, when executed at the client system the third frame operable to:
  receive from the second frame data representing a configuration choice selection associated with the second GUI element;
  post the data received from the second frame as a Hypertext Transfer Protocol (HTTP) request to the server system;
  receive an HTTP response from the server system comprising data reflecting a current state of a configuration in relation to the configuration model, the current state reflecting the configuration choice selection at the second GUI element; and
  communicate the data received from the server system to the second frame to initiate updating of a third GUI element.

22. Software for automatically generating a graphical user interface (GUI) element at a client system according to a current configuration model, the software being embodied in computer-readable media and when executed operable to:
  generate a first frame associated with a web page comprising a JavaServer Page (JSP) and generated at a server system for communication to a client system in connection with a configuration workflow, when generated the first frame comprising data reflecting the current configuration model, when generated the first frame further comprising a JavaScript function operable when executed at the client system in response to a call to automatically:

receive a configuration choice selection at a first GUI element;

access the data stored in the first frame reflecting the current configuration model;

according to the accessed data, determine one or more configuration choices for which a second GUI element needs to be drawn for display to a user associated with the client system in connection with the configuration workflow in response to the configuration choice selection of the first GUI element; and make a callback requesting that the second GUI element for the one or more configuration choices be drawn; and generate a second frame associated with the web page comprising a JSP and generated at the server system for communication to the client system in association with the first frame, when generated the second frame comprising one or more parameters specifying the GUI element that will be appropriate for the configuration choice depending on the current configuration model as reflected in the data stored in the first frame, when generated the second frame further comprising a JavaScript code operable when executed at the client system to automatically:

call the JavaScript function of the first frame to determine a configuration choice for which an appropriate GUI element needs to be displayed to the user associated with the client system in connection with the configuration workflow;

receive a callback from the JavaScript function of the first frame requesting that an appropriate GUI element for the configuration choice be drawn; and according to the one or more parameters stored in the second frame, draw the GUI element that is appropriate for the configuration choice.

23. The software of claim 22, wherein the second GUI element appropriate for the one or more configuration choices is generated on the fly at the client system.

24. The software of claim 22, further operable to reflect a change to the configuration model independent of the configuration choice selection at the first GUI element subsequent to the change, the first frame when generated in connection with a configuration workflow initiated before the change comprising data reflecting the configuration model before the change, the first frame when generated in connection with a configuration workflow initiated after the change comprising data reflecting the configuration model after the change.

25. The software of claim 22, wherein the first and second frames belong to a frameset associated with the web page and are communicated to the client system in response to the user initiating the configuration workflow.

26. The software of claim 22, wherein the configuration model is a product configuration model, the configuration workflow is workflow to configure a product, and the one or more configuration choices is associated with one or more available selections for configuring a corresponding portion of the product.

27. The software of claim 22, wherein the second GUI element for the one or more configuration choices is associated with a dynamic Hypertext Markup Language (DHTML) layer and comprises one of a label, a radio button, a drop-down list box, and a check box.

28. The software of claim 22, wherein:

the first frame comprises a non-viewable configuration application program interface (API) frame; and the second frame comprises one of a plurality of viewable configuration dialog frames associated with the web page.

29. The software of claim 22, wherein the second frame is operable to cause a connector to be created for the second GUI element for the one or more configuration choices in response to generation of the second GUI element, the connector providing an active link between the second GUI element and a property of a configuration element associated with the configuration choice, the connector allowing the second GUI element to be automatically re-drawn in response to the configuration choice selection during the configuration workflow affecting the property of the configuration element without requiring the second frame to be re-drawn in its entirety at the client system.

30. The software of claim 29, wherein:

the first frame comprises a plurality of JavaScript functions each operable when executed at the client system in response to a call to create a connector for a corresponding type of GUI element; and the second frame comprises JavaScript code associated with the second GUI element for the one or more configuration choices the JavaScript code being generated automatically at runtime at the client system in response to generation of the second GUI element and operable to automatically call the JavaScript function in the first frame corresponding to the type of GUI element to create a connector for the second GUI element.

31. The software of claim 22, further operable to generate a third frame associated with the web page at the server system for communication to the client system in association with the first and second frames, when executed at the client system the third frame operable to:

receive from the second frame data representing a configuration choice selection associated with the second GUI element;

post the data received from the second frame as a Hypertext Transfer Protocol (HTTP) request to the server system;

receive an HTTP response from the server system comprising data reflecting a current state of a configuration in relation to the configuration model, the current state reflecting the configuration choice selection at the second GUI element; and communicate the data received from the server system to the second frame to initiate updating of a third GUI element.

32. The software of claim 22, wherein the software consists of the web page comprising the first and second frames.

33. A system for automatically generating a graphical user interface (GUI) element at a client system according to a current configuration model, comprising:

means for generating a first frame associated with a web page comprising a JavaServer Page (JSP) and generated at a server system for communication to a client system in connection with a configuration workflow, when generated the first frame comprising data reflecting the current configuration model, when generated the first frame further comprising a JavaScript function operable when executed at the client system in response to a call to automatically:
  receive a configuration choice selection at a first GUI element;
  access the data stored in the first frame reflecting the current configuration model;
  according to the accessed data, determine one or more configuration choices for which a second GUI element needs to be drawn for display to a user associated with the client system in connection with the configuration workflow in response to the configuration choice selection of the first GUI element; and
  make a callback requesting that the second GUI element for the one or more configuration choices be drawn; and
means for generating a second frame associated with the web page comprising a JSP and generated at the server system for communication to the client system in association with the first frame, when generated the second frame comprising one or more parameters specifying the second GUI element that will be appropriate for the one or more configuration choices depending on the current configuration model as reflected in the data stored in the first frame in response to the configuration choice selection, when generated the second frame further comprising a JavaScript code operable when executed at the client system to automatically:
  call the JavaScript function of the first frame to determine the one or more configuration choices for which the second GUI element needs to be displayed to the user associated with the client system in connection with the configuration workflow;
  receive a callback from the JavaScript function of the first frame requesting that the second GUI element for the one or more configuration choices be drawn; and
  according to the one or more parameters stored in the second frame, draw the second GUI element that is appropriate for the one or more configuration choices.

34. A system for automatically generating a graphical user interface (GUI) element at a client system according to a current product configuration model for a configurable product, comprising:
  a first JavaServer Page (JSP) associated with a web page and generated at a server system for communication to a client system in connection with a product configuration workflow to configure the product, when generated at the server system the first JSP comprising data reflecting the current product configuration model, when generated at the server system the first JSP further comprising a JavaScript function operable when executed at the client system in response to a call to automatically:
    receive a configuration choice selection at a first GUI element;
    access the data stored in the first JSP reflecting the current product configuration model;
    according to the accessed data in the first JSP, determine one or more configuration choices for which a second GUI element needs to be drawn for display to a user associated with the client system in connection with the product configuration workflow in response to the configuration choice selection of the first GUI element, each configuration choice being associated with one or more available selections for configuring a corresponding portion of the product; and
    make a callback requesting that the second GUI element for the one or more configuration choices be drawn; and
  a second JSP associated with the web page and generated at the server system for communication to the client system in association with the first JSP, when generated at the server system the second JSP comprising parameters specifying the second GUI element that will be appropriate for one or more configuration choices in general depending on the current product configuration model as reflected in the data stored in the first JSP in response to the configuration choice selection, when generated at the server system the second JSP further comprising JavaScript code operable when executed at the client system to automatically:
    call the JavaScript function of the first JSP to determine the one or more configuration choices for which the second GUI element needs to be displayed to the user associated with the client system in connection with the product configuration workflow;
    receive a callback from the JavaScript function of the first JSP requesting that the second GUI element for the one or more configuration choices be drawn; and
    according to the parameters stored in the second JSP, draw the second GUI element that is appropriate for the one or more configuration choices, the second GUI element for the one or more configuration choices thereby being generated automatically on the fly at the client system.

35. A system for automatically generating a graphical user interface (GUI) element at a client system according to a current configuration model, comprising one or more JavaServer Pages (JSPs) generated at a server system for communication to a client system in connection with a configuration workflow:
  when loaded at the client system, the one or more JavaServer Pages (JSPs) comprising data reflecting the current configuration model;
  when loaded at the client system, the one or more JavaServer Pages (JSPs) comprising one or more parameters specifying the GUI element that will be appropriate for a configuration choice depending on the current configuration model as reflected in the data; and
  when executed at the client system, the one or more JavaServer Pages (JSPs) being operable to automatically:
    receive a configuration choice selection at a first GUI element;
    determine, according to the data reflecting the current configuration model, one or more configuration choices for which a second GUI element needs to be drawn for display to a user associated with the client system in connection with the configuration workflow in response to the configuration choice selection; and
    draw, according to the one or more parameters, the second GUI element that is appropriate for the determined one or more configuration choices.

* * * * *